United States Patent
Slye et al.

(10) Patent No.: US 7,444,751 B1
(45) Date of Patent: *Nov. 4, 2008

(54) LINEAR DISTANCE MEASUREMENT BY NON-DRIVEN ARM

(75) Inventors: Bradley D. Slye, Plymouth, MN (US); Daniel E. Bisila, Blaine, MN (US)

(73) Assignee: Electro-Sensors, Inc., Minneapolis, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/863,910

(22) Filed: Sep. 28, 2007

(51) Int. Cl.
*G01B 5/02* (2006.01)
*G01B 7/02* (2006.01)
*G01B 11/02* (2006.01)

(52) U.S. Cl. .................................. 33/1 PT; 33/700
(58) Field of Classification Search .................. 33/559, 33/556, 1 MP, 1 PT, 503, 700, 709
See application file for complete search history.

(56) References Cited

U.S. PATENT DOCUMENTS

| 4,229,907 A | 10/1980 | Hall |
| 4,474,440 A | 10/1984 | Kramer et al. |
| 4,583,554 A | 4/1986 | Mittelman et al. |
| 4,676,002 A | 6/1987 | Slocum |
| 5,131,166 A | 7/1992 | Weber |
| 5,341,574 A | 8/1994 | Bieg |
| 5,724,264 A * | 3/1998 | Rosenberg et al. .......... 702/152 |
| 6,038,815 A | 3/2000 | Manini |
| 6,149,301 A | 11/2000 | Kautzer et al. |
| 6,408,573 B1 | 6/2002 | Fukumoto et al. |
| 6,501,263 B1 | 12/2002 | Nyce |
| 6,682,157 B2 | 1/2004 | Ito |
| 7,191,527 B2 | 3/2007 | Slye et al. |
| 2005/0024216 A1 | 2/2005 | Crooks et al. |

FOREIGN PATENT DOCUMENTS

| EP | 0 257 100 | 3/1988 |
| WO | WO 96/26044 | 8/1996 |
| WO | WO 2005/029128 | 3/2005 |

* cited by examiner

*Primary Examiner*—Yaritza Guadalupe-McCall
(74) *Attorney, Agent, or Firm*—Jeffert Jay & Polglaze, P.A.

(57) ABSTRACT

The linear distance measurement apparatus comprises a non-driven, extendable/retractable arm mechanism that is mounted such that an arc movement of the arm describes a linear distance. A rotary sensor mechanism is coupled to the non-driven arm. The sensor measures the arc movement of the arm and translates the arc movement to the linear distance.

17 Claims, 5 Drawing Sheets

LINEAR DISTANCE MEASUREMENT BY NON-DRIVEN ARM

BACKGROUND

I. Field of the Invention

The present invention relates generally to electrical sensors and more particularly to devices to measure linear distance.

II. Description of the Related Art

Doors/slide gates on grain chutes and other similar access hatches are typically moved by hydraulic rams or electric motors in conjunction with a screw drive mechanism or a rack and pinion drive mechanism. Multiple methods can be used to determine the distance of hatch travel during an opening or closing operation.

For example, in a rack and pinion drive mechanism that is driven by a motor, an encoder can be used to count the quantity of rotations of the pinion to determine the distance the hatch has moved linearly. A certain quantity of rotations may equal a certain distance that the hatch has moved.

One problem with this method is slippage of the pinion on the rack. If the rack is damaged or some foreign material has fouled the teeth of the rack, the pinion may be turning without any corresponding movement of the hatch. The rotation count is therefore going to be inaccurate resulting in an inaccurate measurement of the hatch movement.

Another problem with such a method is that the loss of power to the measurement device can result in a loss of awareness of the position of the hatch. For example, the rotation count may determine that the hatch has been opened half-way. If the power to the measurement mechanism is lost and then subsequently restored, the count that was stored in memory is reset to zero and, therefore, the present position of the hatch is now unknown.

There is a need in the art for an improved way to measure and track linear motion.

SUMMARY

The present invention encompasses an apparatus to measure linear distance using a non-driven, extendable arm that converts the linear movement to a rotational movement. The arm extends and retracts to convert the linear distance into rotary using multiple fixed points.

The linear distance measurement apparatus comprises a non-driven arm that is mounted such that an arc movement of the arm describes a linear distance. A rotary sensor mechanism is coupled to the non-driven arm. The sensor measures the arc movement of the arm and translates the arc movement to the linear distance.

DETAILED DESCRIPTION

The embodiments of the present invention provide a means for measuring linear motion using a non-driven, extendable arm and rotary sensor. The apparatus can measure and keep track of a linear movement even if the drive mechanism malfunctions or power to the apparatus is lost.

Figure 1:
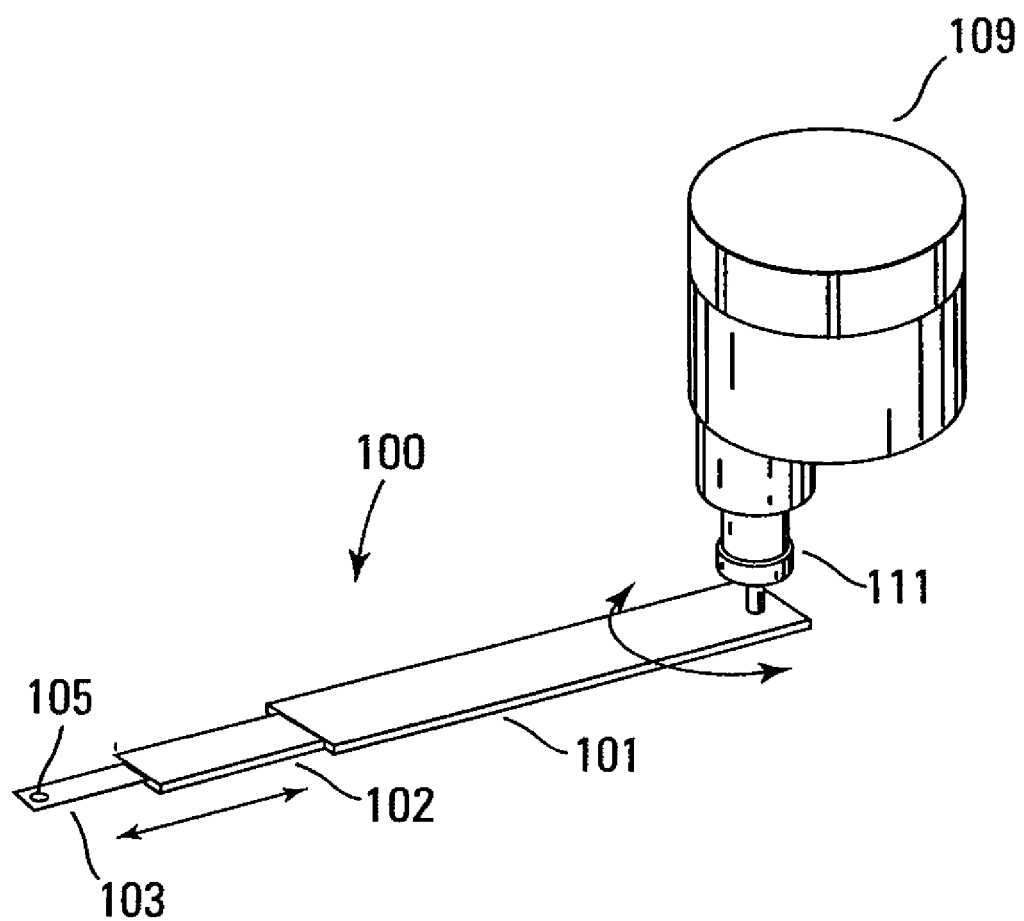
FIG. 1 shows one embodiment of an extendable arm and sensor mechanism of the present invention.

FIG. 1 illustrates one embodiment of a non-driven, extendable arm 100 and sensor mechanism 109 of the present invention. In the illustrated embodiment, the arm 100 is comprised of the main portion 101 of the arm 100 multiple extensions 102, 103. The extensions 102, 103 telescope within the main portion 101 thus enabling the arm 100 to extend and retract as it moves in an arc around the sensor 109.

The quantity of extensions 102, 103 is dependent on each application. For example, one embodiment of the arm 100 may be comprised of only the main portion 101 of the arm 100 and one extension 103. Still other embodiments that have larger slide gates may require more than two extensions 102, 103.

The last extension 103 can have a hole 105 through which a mounting bolt or other mounting device can be attached. Alternate embodiments can use other means for mounting the arm 100 to a hatch or slide gate.

The extendable arm 100 is coupled to the sensor mechanism 109 through a rotating shaft 111 and internal gearing, in one embodiment, that transfers the rotation of the arm 100 to the sensor mechanism 109. The sensor mechanism 109 can be an encoder that measures the amount of arc of a circle through which the arm 100 moves.

In one embodiment, the encoder is an optical encoder that employs a light source (e.g., light emitting diode) on one side of a disk and a light sensor on the other side of the disk. The disk has multiple apertures through which the light is allowed to pass as the disk rotates. The light sensor then determines the rotary position of the disk by converting light patterns and thus the position of the shaft that is coupled to the encoder. Encoders are well known by those skilled in the art.

While the embodiment of FIG. 1 uses an encoder to measure the arc and, therefore, the linear distance that the extendable arm moves, alternate embodiments can use other measurement means. For example, a potentiometer may be used to determine the amount of arc through which the arm moves by measuring different voltage levels at various positions of the slide gate. In another embodiment, the Hall effect of a magnetic sensor can be used.

Figure 2:
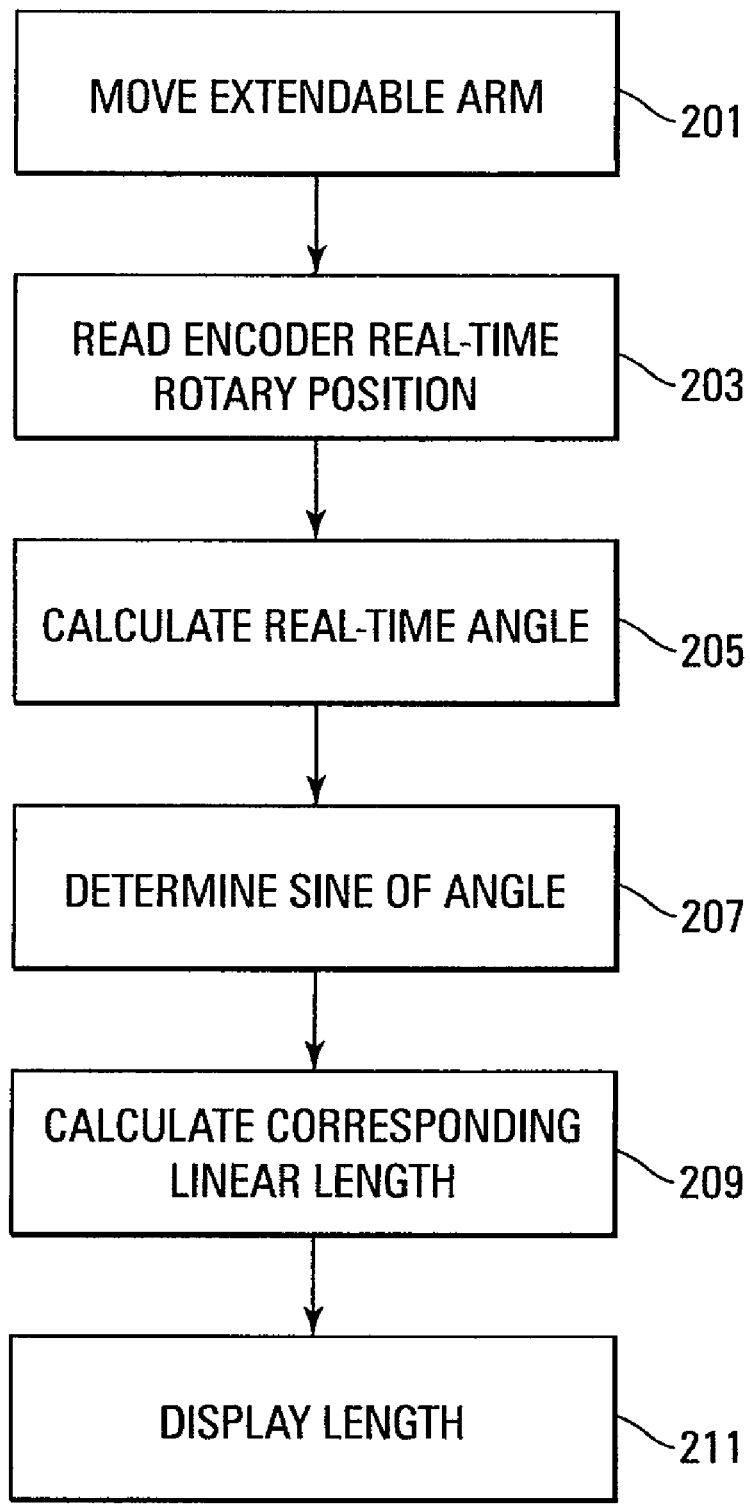
FIG. 2 shows a flowchart of one embodiment of a method for measuring linear distance.

FIG. 2 illustrates a flowchart of one embodiment of the method of the present invention for determining linear distance from a rotary sensor. This method assumes initial location settings have been determined. In one embodiment, this can be accomplished by a calibration operation in which a certain number of encoder positions are assigned to different positions of the slide gate. For example, 0 counts might be the closed position, 256 counts the fully open position, and 128 counts the half open position. In alternate embodiments, these encoder positions for the initial location settings may also be determined in ways other than an initial calibration (e.g., estimates).

After the non-driven, extendable arm moves 201, the real-time rotary position value is determined from the encoder 203. This value is compared with the initial location setting of the fully closed position to calculate the corresponding real-time angle 205 of the extendable arm. The sine of that angle is then determined 207. This can be accomplished by a look-up table stored in the memory (not shown) of the sensor processor.

The corresponding linear length 209 is then determined from the sine of the angle 207. This can be accomplished by using the mathematical Law of Sines triangle formula. This law can be represented as length of triangle side a=length of triangle side b*(sin(angle A)/sin(angle B)) where A is the angle opposite side a and B is the angle opposite side b. The linear length is indicative of how wide the slide gate is open. In one embodiment, the length is represented in percentage of open (e.g., 50% open). Alternate embodiments can represent the length in units of inches, feet, meters, or other linear units. If the system incorporates a display, the linear length can be displayed.

Figure 3:
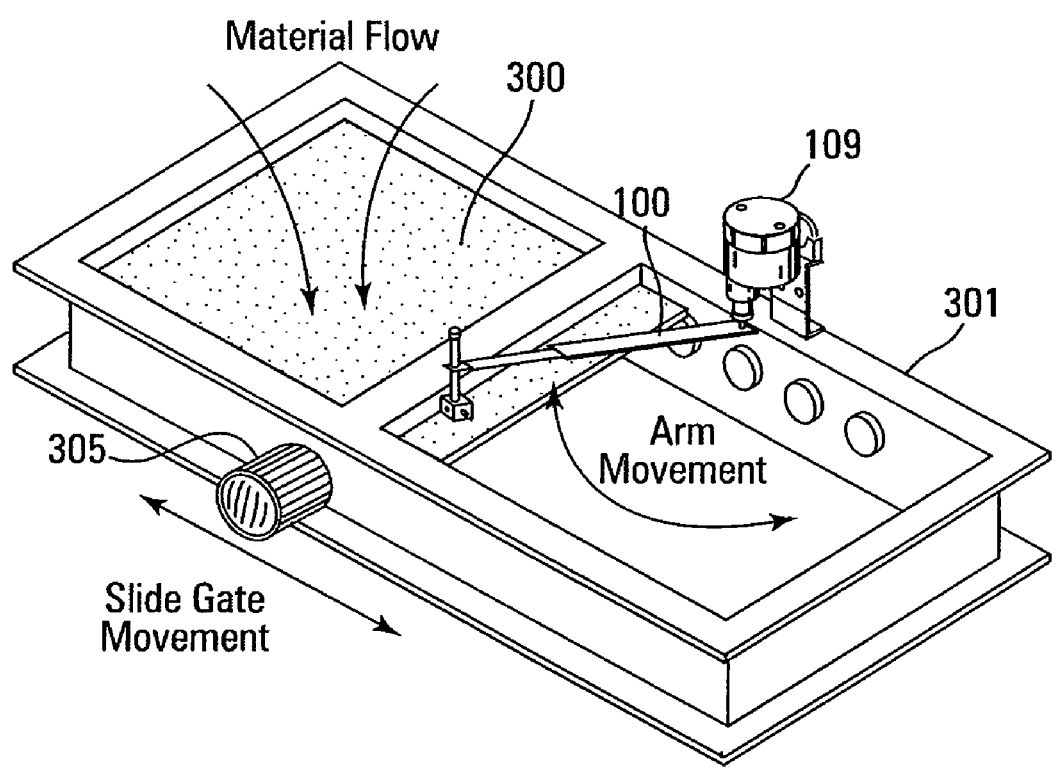
FIG. 3 shows a top perspective view of one embodiment of a slide gate system of the present invention that incorporates the arm and sensor mechanism of FIG. 1.

FIG. 3 illustrates a top perspective view of one embodiment of a slide gate system with the present invention that incorporates the non-driven, extendable arm and sensor mechanism of FIG. 1. The slide gate system illustrated can be used to allow grain or other material to flow through to a lower area. This flow is shown by the Material Flow direction as indicated. This system is for purposes of illustration only as the embodiments of the present invention can be used to measure linear distances of applications other than slide gates.

The system of FIG. 3 is comprised of a slide gate 300 that moves laterally through a frame 301. The movement of the slide gate 300 is controlled by an electric motor 305 that drives a pinion. The pinion is comprised of teeth that fit into the rack on the underside of the slide gate 300. As the motor 305 turns the pinion, the teeth of the pinion move the rack and thus the slide gate 300. While the rack and pinion drive gear are not shown, these elements are well known by those skilled in the art.

Alternate embodiments of the slide gate system can use other methods than the electric motor and rack and pinion drive for moving the slide gate or hatch. For example, the embodiments can include a pneumatic or hydraulic ram or a screw drive to slide the gate 300.

When the sensor mechanism of the present invention is mounted on a slide gate system as shown in the embodiment of FIG. 3, the extendable arm 100 is extended when the slide gate 300 is fully closed. As the slide gate 300 moves to a partially open position, the arm 100 begins to retract so that the extension or extensions of the arm slide into the main portion of the arm as illustrated in FIG. 1. The arm 100 is at its shortest length when it is substantially perpendicular with the frame 301 side. As the slide gate 300 continues to open further, the arm 100 again begins to extend outward in a telescoping fashion until it is at its maximum extension when the gate 300 is fully open.

This system in FIG. 3 shows that as the slide gate 300 opens, the arm moves in an arc of approximately 90°. Depending on the sensing scheme used, this may translate into a rotational movement of greater or less than 90° within the encoder 109. Alternate embodiments that use different sensing schemes may translate the 90° movement into alternative movements or may not translate the movement at all.

The sensor processor, that can be located within the sensor mechanism housing 109, is responsible for reading the rotational movement of the sensor. The processor can then translate this movement into a linear distance as described previously.

The embodiment of FIG. 3 shows that the extendable arm is a non-driven measurement device that converts the linear movement of the slide gate to a rotary motion. This is in contrast to prior art measurement devices that use a rotary drive shaft to perform the measurements on linear movement but are susceptible to the problems described previously.

Figure 4:
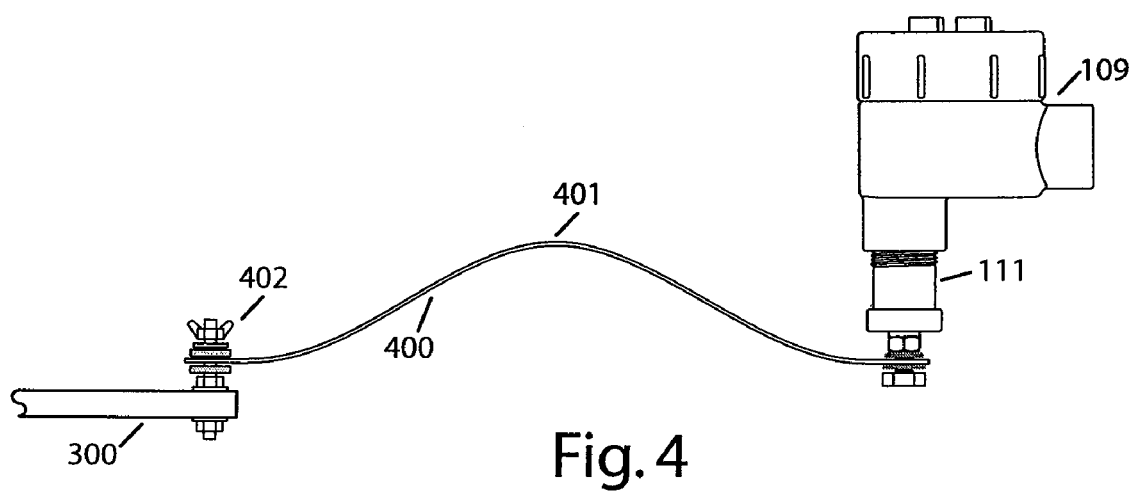
FIG. 4 shows an alternate embodiment of an extendable arm and sensor mechanism in accordance with the present invention.

FIG. 4 illustrates an alternate embodiment of the non-driven, extendable arm mechanism and sensor mechanism in accordance with the present invention. In this embodiment, the extendable arm 400 is comprised of a metal band that couples the rotating shaft 111 of the sensor mechanism 109 to the sliding gate 300 (see FIG. 3).

As the sliding gate 300 is moved, the material of the extendable arm 400 extends and compresses as the arm 400 moves about an arc. The middle portion 401 of the arm 400 is shown in a typical compressed condition while a fully extended condition of the middle portion 401 might have the arm in a flat configuration, depending on the length of the arm 400. The end portion 402 of the extendable arm 400 is coupled to the sliding gate 300 and is the portion of the arm that moves linearly along a linear distance.

The extendable arm 400 is, in one embodiment, comprised of some type of metal or steel such as low-carbon steel, high-carbon steel, spring-grade steel, or stainless steel. Alternate embodiments can use other types of material (e.g., plastic) other than steel or metal that have the properties of being extendable and compressible/retractable while still providing a rigid connection between the sensor 109 and the slide gate 300.

A metal band can have a thickness in the range of 0.015-0.050 inches and a width in the range of 0.75-2.00 inches. However, alternate embodiments can use other thicknesses and widths. Extendable arms that are comprised of other materials than steel or metal can also have different dimensions than those listed.

Figure 5:
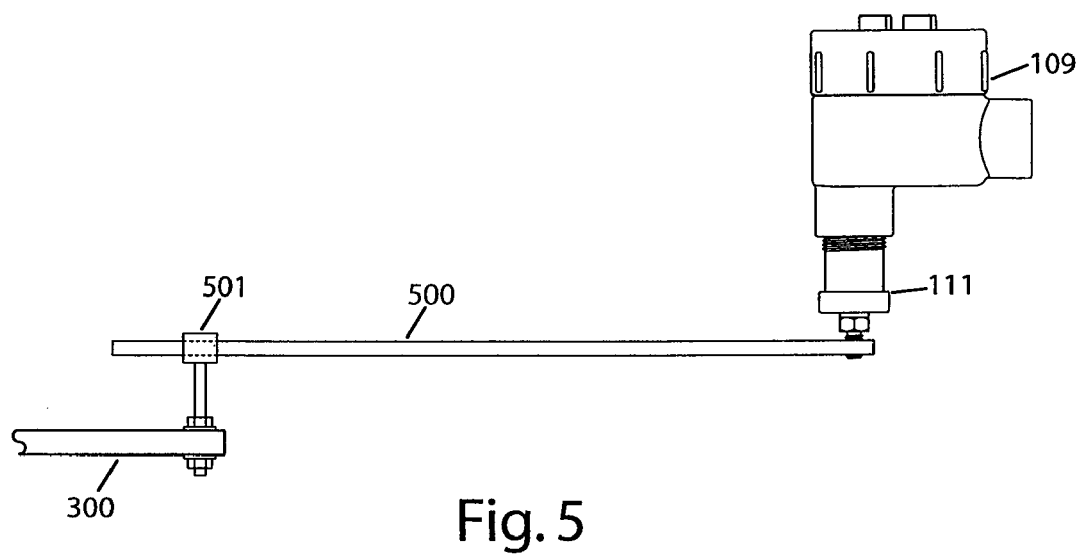
FIG. 5 shows yet another embodiment of an extendable arm and sensor mechanism in accordance with the present invention.

FIG. 5 illustrates yet another embodiment of the non-driven, extendable arm mechanism and sensor mechanism in accordance with the present invention. The extendable arm mechanism in this embodiment is comprised of a constant length rod 500 that is connected to the rotating shaft 111 of the sensor mechanism 109 and a glide tube 501 that is connected to the sliding gate 300. The rod 500 is inserted into the glide tube 501 and slides through the glide tube 501 as the arm moves around the arc. Even though the "actual length" of the arm does not change, such a mechanism allows the arm portion 500 "effective length" to extend and retract as necessary as the glide tube portion 501 moves linearly.

The rod 500 can be a solid rod comprised of some rigid or semi-rigid material (e.g., metal, plastic). The glide tube can similarly be comprised of any material that can be connected to the slide gate 300 and formed into a tube. The dimensions of the rod 500 and glide tube 501 are only limited in that the rod 500 must be able to move back and forth within the glide tube 501 without restriction.

Numerous modifications and variations of the present invention are possible in light of the above teachings. It is therefore to be understood that within the scope of the appended claims, the invention may be practiced otherwise than as specifically described herein.

What is claimed is:

1. A linear distance measurement apparatus comprising:
 a moveable arm mechanism mounted such that an arc movement of the arm mechanism describes a linear distance wherein the arm mechanism is not directly driven and a first portion of the arm mechanism is adapted to extend and retract as it moves through the arc such that a second portion of the arm mechanism moves only linearly along the linear distance; and
 a rotary sensor mechanism, coupled to an end of the first portion of the movable arm mechanism, for sensing an arc movement of the arm mechanism and translating the arc movement to the linear distance.

2. The apparatus of claim 1 wherein the arm mechanism is comprised of a bendable metallic material or a solid rod with a guide tube.

3. The apparatus of claim 2 wherein the arm mechanism is comprised of a steel band.

4. The apparatus of claim 3 wherein the steel band is comprised of one of low-carbon steel, high-carbon steel, spring-grade steel, or stainless steel.

5. The apparatus of claim 1 wherein the sensor mechanism is one of a potentiometer or a magnetic sensor.

6. The apparatus of claim 1 wherein the sensor mechanism is an optical encoder.

7. The apparatus of claim 1 wherein the sensor mechanism electrically detects rotation.

8. A linear distance measurement apparatus comprising:
a movable arm mechanism having an arm portion with a first end that extends and retracts through a glide tube portion wherein the arm portion is not directly driven and an effective length of the arm portion extends and retract as it moves through an arc and wherein the glide tube portion moves only in a linear fashion; and
a rotary sensor mechanism, coupled to an opposite end of the arm portion from the first end, for sensing the arc movement of the arm portion and translating the arc movement to a linear distance along which the glide tube portion moves.

9. The apparatus of claim 8 wherein the rotary sensor mechanism is an encoder that is adapted to sense a rotary motion of the coupled end of the non-driven arm.

10. The apparatus of claim 9 wherein the encoder is an optical encoder that converts light patterns to determine a degree of rotation of the non-driven arm.

11. The apparatus of claim 8 and further including a sensor processor coupled to the rotary sensor mechanism to perform the translation of the arc movement to the linear distance.

12. A linear distance measurement apparatus comprising:
a moveable arm mechanism comprising a metal band and mounted such that an arc movement of the arm mechanism describes a linear distance wherein the arm mechanism is not directly driven and a middle portion of the metal band is adapted to extend and retract as it moves through the arc such that a first end of the arm mechanism moves only linearly along the linear distance; and
a rotary sensor mechanism, coupled to a second end of the movable arm mechanism, for sensing an arc movement of the arm mechanism and translating the arc movement to the linear distance.

13. A slide gate system comprising:
a slide gate that is adapted to move;
means for moving the slide gate; and
a linear distance measurement apparatus coupled to the slide gate and not connected to the means for moving, the apparatus comprising:
a moveable arm mechanism mounted such that an arc movement of the arm mechanism describes a linear distance wherein the arm mechanism is not directly driven and a first portion of the arm mechanism is adapted to extend and retract as it moves through the arc such that a second portion of the arm mechanism moves only linearly along the linear distance; and
a rotary sensor mechanism, coupled to an end of the first portion of the movable arm mechanism, for sensing an arc movement of the arm mechanism and translating the arc movement to the linear distance.

14. The system of claim 13 wherein the means for moving includes an electric motor coupled to a rack and pinion system.

15. The system of claim 13 wherein the means for moving includes a screw drive.

16. The system of claim 13 wherein the slide gate is adapted to move laterally between an open and a closed position in a frame assembly.

17. The system of claim 13 wherein the first portion of the arm mechanism is comprised of a metal rod and the second portion of the arm mechanism is a glide tube coupled to the slide gate.

* * * * *